Sept. 3, 1946. L. E. McFARREN 2,407,171
FIXED RESISTOR
Filed May 16, 1944
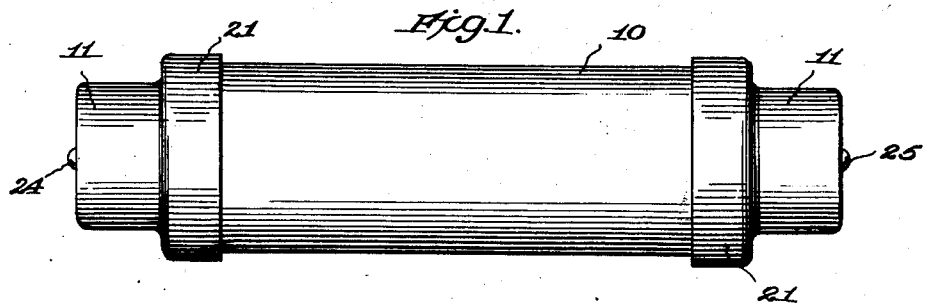
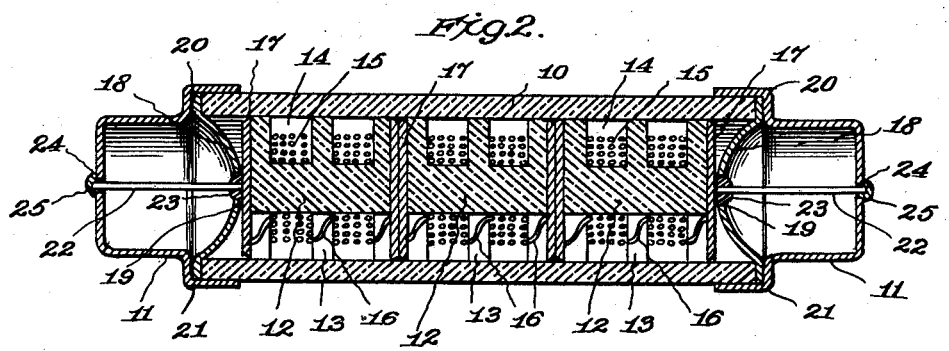
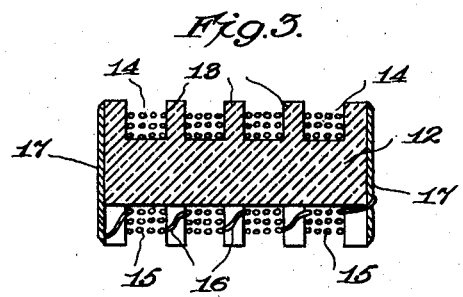
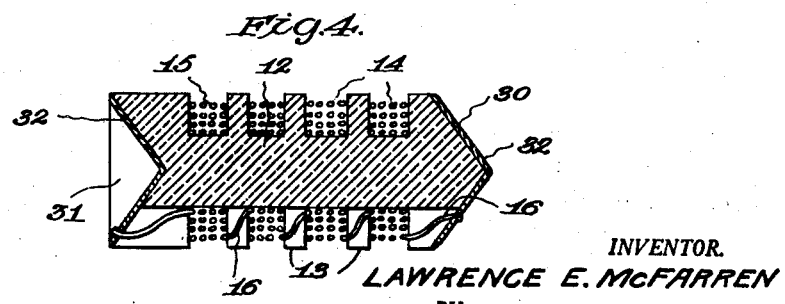
INVENTOR.
LAWRENCE E. McFARREN
BY Chester F. Carlson
ATTORNEY Patented Sept. 3, 1946

2,407,171

UNITED STATES PATENT OFFICE 2,407,171

FIXED RESISTOR

Lawrence E. McFarren, Indianapolis, Ind., assignor to P. R. Mallory & Co., Inc., Indianapolis, Ind., a corporation of Delaware Application May 16, 1944, Serial No. 535,788

1 Claim. (Cl. 201—67)

The present invention relates to resistors, and, more particularly, to wire-wound resistors of the type employed in connection with electrical measuring instruments for extending the range of measurement.

As those skilled in the art know, precision external meter resistors of the described character essentially comprise a glass or ceramic enclosure with ferrules at the ends thereof. Within the enclosure the windings of resistance wire are provided on a suitable base likewise constituted of glass or of ceramic material. These units are very difficult to make since their resistance has to be within very close tolerances, they have to be non-inductively wound and in addition have to pass severe tests. Another practical difficulty experienced in connection with these resistors was that they had to be manufactured in a large number of different sizes and resistance values in accordance with the specific application contemplated. Of course, manufacturing and carrying in stock a large number of different resistance values was connected with considerable inconvenience as it necessitated tying up a great deal of capital and raw material in the form of resistors of different values including such values for which there was very little demand. Various suggestions and proposals have been made to eliminate this difficulty but, as far as is known, none of these suggestions and proposals was completely satisfactory and successful when carried into practice on a practical and commercial scale.

It is an object of the present invention to provide a precision meter resistor which completely eliminates the foregoing difficulties.

It is another object of the present invention to provide a resistor of novel and improved character which permits building up any practically desirable resistance value from a plurality of standard values.

It is a further object of the present invention to provide an external meter resistor of the ferrule type comprising an insulative enclosure with ferrules at the ends thereof, within which there are disposed a plurality of serially connected unitary resistors selected from a few standard values in accordance with the desired application.

It is also within the contemplation of the invention to provide a ferrule type meter resistor which may be assembled from appropriately selected standard elements to constitute a precision resistance of any desired value within a wide range.

The invention also contemplates a precision external meter resistor which is simple in structure, is capable of passing the most severe test, and which may be readily manufactured and sold on a practical and commercial scale at a low cost.

Other and further objects and advantages of the invention will become apparent from the following description, taken in conjunction with the accompanying drawing; in which Fig. 1 illustrates a side elevational view of a ferrule type resistor embodying the principles of the present invention;

Fig. 2 depicts a longitudinal sectional view of the unitary resistor;

Fig. 3 shows a similar sectional view of one of the resistance elements or units which may be employed in the preferred form of the invention; and Fig. 4 is a longitudinal sectional view of a modified form of the resistance element or unit which may be incorporated into the resistor of the invention.

While a preferred embodiment of the invention is described herein, it is contemplated that considerable variation may be made in the method of procedure and the construction of parts without departing from the spirit of the invention. In the following description and in the claims, parts will be identified by specific names, for convenience, but they are intended to be as generic in their application to similar parts as the art will permit.

Referring now more particularly to Figs. 1 to 3 of the drawing, reference character 10 denotes a cylindrical casing constituted of moisture and heat-resistant insulating material such as, for example, glazed porcelain, "Isolantite," "Pyrex," and the like. The ends of casing 10 are closed by means of ferrules 11 of brass, bronze, or some other metal.

Within casing 10 there are disposed end to end a plurality of resistance elements or units. Each of these comprises a cylindrical spool 12 with integrally formed barriers 13 defining winding spaces 14 within which there are disposed windings 15 of resistance wire. In accordance with the usual practice, an even number of winding spaces is provided for one unit and the direction of winding is reversed for adjoining winding spaces in order to make the finished resistance substantially non-inductive. Barriers 13 are also provided with the usual radial slots for the passage of the interconnecting portions 16 of the resistance wire. Cylindrical spools 12 may be constituted of the same materials as casing 10, such ar particularly "Isolantite."

The end faces of spools 12 may be provided with a metalized layer 17 to which the ends of the resistance wire may be soldered. Electrical connection between the adjoining ends of the several spools may be established by brazing or soldering the silvered ends of the spools together. As an alternative, jumpers (not shown) may be soldered across from one spool to the next one in a manner well understood.

Electrical connection between the serially connected resistance units and the end ferrules 11 may be secured in a great variety of ways. One form of construction which was found satisfactory comprises an apertured disc or spider 18 of spring metal having an opening 19 in the center thereof and having its circumferential edges 20 clamped between the ends of casing 10 and flanges 21 of the ferrules. Disc or spider 18 will resiliently hold the stacked resistance units within tubular casing 10. A conductor 22 has one of its ends extending through opening 19 in disc 18 and soldered to metallic layer 17 at the end of the spool at 23 while its other end extends through a corresponding opening 24 in ferrule 11 and is soldered thereto at 25. Ferrules 11 may be secured to the ends of casing 10 in various ways such as by cementing or by silvering the ends of the casing tube and soldering the flanges of the ferrules thereto.

From the foregoing description the operation of the resistor of the invention and its advantages will be readily understood by those skilled in the art. Obviously, by manufacturing resistance elements or units in a few standard values, a very large number of resistor values may be readily assembled with considerable savings in manufacturing cost. The number of resistance values which have to be carried in stock is greatly reduced and at the same time any desired value within the practical range is instantaneously available.

The advantages of the present invention are particularly accentuated by recent efforts in the direction of standardizing meter resistors. Thus, the American Standards Association has issued specifications for ferrule type meter resistors covering three mechanical sizes and thirteen resistance values from 0.5 to 6 megohms. Each standard resistance value is a multiple of 0.3 megohm, 0.5 megohm and 1.0 megohm. The resistor of the present invention, of course, is excellently adaptable for the manufacture of such standard resistors since by carrying in stock only resistance units of three different values, any resistance within the standard range may be immediately assembled.

Fig. 3 is a longitudinal sectional view of a resistance unit which is in every respect identical with the units shown in Fig. 2 with the only difference that four winding spaces 14 are defined therein by means of a corresponding number of barriers 13. The structure and the operation of the resistance unit should be self-explanatory. Fig. 4 is a similar view of a modified form of resistance unit which is also practically identical with the structures shown in Figs. 2 and 3, similar reference characters being used to denote corresponding parts. The difference resides in that one end of spool 12 is provided with a head 30 of conical shape while the other end of the spool is provided with a conical depression 31 of conforming shape. Both head 30 and depression 31 are coated with a metalized layer 32 to which the ends of the resistance wire are electrically connected. A plurality of such resistance elements or units may be readily stacked or mounted end to end by inserting the conical head of one unit into the corresponding depression of the next one. Electrical connection between the several stacked units may be made by brazing metalized layers 32 together or by means of soldered jumpers, as it is set forth more fully in the foregoing.

While the present invention, as to its objects and advantages, has been described herein as carried out by specific embodiments thereof, it is not desired to be limited thereby but it is intended to cover the invention broadly within the spirit and scope of the appended claims.

What is claimed is:

An electrical resistor comprising in combination an insulative tube, a ferrule at each end of said tube, a plurality of stacked unitary resistance elements mounted within said tube, each of said resistance elements including an insulative spool with windings of resistance wire thereon having one of its ends formed with an external conical surface and its other end formed with a corresponding internal conical surface and a metalized layer on each of said surfaces constituting terminals for said windings, the external and internal conical surfaces of adjoining spools being adapted to mate with each other to maintain the relative position of the spools in the stack, means including a fused metallic bond between each pair of adjoining metalized layers for connecting all of said windings in series, and means for connecting the terminals of said serially connected windings to said ferrules.

LAWRENCE E. McFARREN.